US006664475B1

(12) United States Patent
Ellison

(10) Patent No.: US 6,664,475 B1
(45) Date of Patent: Dec. 16, 2003

(54) ELECTRIC WIRE DISTRIBUTOR CONNECTOR

(76) Inventor: Abram Arnold Ellison, 19925 Lauder, Detroit, MI (US) 48235

( * ) Notice: Subject to any disclaimer, the term of this patent is extended or adjusted under 35 U.S.C. 154(b) by 0 days.

(21) Appl. No.: 10/337,839

(22) Filed: Jan. 8, 2003

Related U.S. Application Data

(60) Provisional application No. 60/345,610, filed on Jan. 4, 2002.

(51) Int. Cl.[7] ................................ H02G 15/10
(52) U.S. Cl. ................................ 174/92
(58) Field of Search ................................ 174/84 C, 88 R, 174/92, 138 F

(56) References Cited

U.S. PATENT DOCUMENTS 2,112,753 A * 3/1938 Abbott ..................... 174/88 R
3,002,045 A * 9/1961 Ayer ..................... 174/88 R
3,049,582 A * 8/1962 Grunbaum ..................... 174/92
3,115,541 A * 12/1963 Hanner et al. ..................... 174/92
3,519,731 A * 7/1970 Grunbaum ..................... 174/138 F
3,902,780 A * 9/1975 Dola ..................... 439/411
6,333,464 B1 * 12/2001 Ellison ..................... 174/92

* cited by examiner

*Primary Examiner*—Chau N. Nguyen

(57) ABSTRACT

The electric wire distributor connector is for receiving and distributing electric current through electric wires. It includes the housing having a base and a cover placeable in covering relations over the base and being removably attached thereto. The base and cover are made from non-conducting materials such as plastic and define an inlet therebetween for receiving the electrical wires. One or more terminal assemblies are provided, each assembly having one or more metallic conductors attached to the base. A metallic distributor ring is mounted in the base and a metallic extension rod having a pair of ends is provided with one end being attached to the metallic conductor and the other end of the extension rod being attached to the distributor ring to transfer current from the metallic conductor to the distributor ring and vice verse. Moreover, the electric wire distributor connector provides the means for the electric car to run continuously or, in other words, allowing the batteries to recharge themselves, and also run an electric motor, which runs a generator that recharges the batteries. This allows the electric car to run continuously without being recharged by any outside source.

31 Claims, 5 Drawing Sheets

ELECTRIC WIRE DISTRIBUTOR CONNECTOR

CROSS-REFERENCE TO RELATED APPLICATION

The present application is based on U.S. provisional patent application Serial No. 60/345,610, filed Jan. 4, 2002. The complete disclosure of the U.S. provisional patent application is incorporated herein by reference.

BACKGROUND OF THE INVENTION

1. Field of the Invention

The present invention relates to electric wiring, and to equipment for use in distributing electric current in one or more directions. More particularly, the present invention relates to an electric wire distributor connector for receiving and distributing electric current. More importantly the electric wire distributor connector can be modified to be used with any type of electric wiring. Another use is that it can also provide the means for the electric car to run continuously, by allowing the batteries to recharge themselves, and also run an electric motor, which runs a generator that recharges the batteries. This allows the electric car to run continuously, or in other words perpetually without being recharged by any outside source.

2. Description of the Prior Art

My U.S. Pat. No. 6,33,464 issued Dec. 25, 2001, discloses an electric wire splice connector for facilitating electric current transmission through splicing electric wires. It includes a housing made of non-conductive material and a terminal assembly, including at least one and preferably a plurality of conductive terminals, which are connected to the housing on a mounting block. The housing is provided to surround and protect the spliced wires and includes a base and a cover peaceable in covering relation over the base. The housing cover is removable attached to the base. The housing base and cover define a protective space therebetween and also defines an inlet and an outlet therebetween for respectively receiving wires in opposite ends of the assembled housing, for connection of the wires within the protected space. The outlet is preferably located at an end of the housing opposite the inlet. The housing base includes one or more mounting blocks, for supporting metallic conductors. The terminal assembly includes at least two metallic conductors attached to the base, which may be provided as generally square metal bars. The terminal assembly also includes adjustably tightenable clamps for clamping wires against the metallic conductors. The clamps are operatively connected to the housing base, or are adjustably attached to the conductors.

BRIEF SUMMARY OF THE INVENTION

It is a feature of the present invention to provide an electric wire distributor connector for receiving and distributing electric current through electric wires, with the connector comprising a connector housing, and a distributor comprising a distributor housing. The connector housing and distributor housing are connected together and made from a non-conductive material. The electric wire distributor connector housing comprise a detachable top and bottom cover placed one on top of the other.

Another feature of the present invention is to provide an electric wire distributor connector of the aforementioned type wherein the connector housing and cover define an inlet therebetween for respectively receiving electric wires, a terminal assembly comprising a plurality of mounting blocks attached to the connector base and a plurality of metallic conductors operatively attached to the mounting blocks, one metallic conductor for each mounting block.

Still another feature of the present invention is to provide an electric wire distributor connector of the aforementioned type wherein a plurality of metallic extension rods are provided, each having a pair of ends, one extension rod for each of the metallic conductors, with one end of each extension rod being attached to a corresponding metallic conductor; and a plurality of spaced apart metallic distributors placeably one above and the other with the other end of the extension rod attached to a corresponding distributor to transfer current from the metallic conductors to the distributors and vice versa.

A further feature of the present invention is to provide an electric wire distributor connector wherein the distributors are in the form of spaced apart metallic annular rings, with the other ends of the extension rods being attached to the rings. A still further feature of the present invention is to provide an electric wire distributor connector of the aforementioned type wherein the outer periphery of each ring can be formed on a radius, with the inside of each ring being flat.

Another feature of the present invention is to provide an electric wire distributor connector of the aforementioned type wherein a plurality of spacers support the distributor rings, with the spacers being attached to the distributor base. The spacers can be curved on the inside and flat on the outside or, vise versa to conform to the distributor rings.

Still another feature of the present invention is to provide an electric wire connector of the aforementioned type wherein the mounting blocks are separate elements which are spaced apart and are secured to the base of the connector housing.

A further feature of the present invention is to provide an electric wire distributor connector of the aforementioned type wherein the mounting blocks are separate elements which are integrally formed as part of the connector housing when the connector housing is made or cast.

Still another feature of the present invention is to provide an electric wire distributor of the aforementioned type wherein the mounting blocks can be color coded to match insulation surrounding the individual electric wires.

A further feature of the present invention is to provide an electric wire distributor of the aforementioned type wherein the connector housing is provided with separate wedges for separating, and spacing apart wires of incoming and outgoing electrical wires.

Another feature of the present invention is to provide an electric wire distributor connector of the aforementioned type wherein the connector housing is provided with a plurality of vertically upstanding tubular internally threaded bosses which receive threaded fasteners therein to removably connect the cover to the connector and distributor housings.

Still another feature of the present invention is to provide an electric wire distributor connector of the aforementioned type wherein the separator wedges can be provided with threaded holes to receive threaded fasteners therein to removably connect the cover to the connector and distributor housings.

A further feature of the present invention is to provide an electric wire distributor connector of the aforementioned type wherein the distributor housing is provided with a plurality of punch-out holes formed therein for use in mounting the electric wire distributor to a wall or other substrate.

A still further feature of the present invention is to provide an electric wire distributor of the aforementioned type wherein a plurality of punch-out areas are provided in the distributor housing for the purpose of creating holes in the housing to accommodate electric wires.

Still another feature of the present invention is to provide an electric wire distributor of the aforementioned type wherein the terminal assembly includes a plurality of clamping members which overlie the metallic conductors and through which threaded fasteners extend to operatively connect the clamping members and metallic conductors to the mounting blocks.

A still further feature of the present invention is to provide an electric wire distributor of the aforementioned type wherein each clamping member is an inverted substantially U-shaped member which is placed over the exposed ends of the wires and the ends of the metallic connector for clamping the wire ends against the metallic conductor.

A still further feature of the present invention is to provide an electric wire distributor connector of the aforementioned type wherein exposed ends of the electric wires are placed between the U-shaped members and the tops of the metallic conductors and thereafter the threaded fasteners are tightened to releasable attach the wires to the metallic conductors.

Another further feature of the present invention is to provide an electric wire distributor connector of the aforementioned type wherein the threaded fasteners of the terminal assembly form the clamping members, with the exposed ends of the wires wrapped around the threaded fasteners and the threaded fasteners are then tightened to clamp the ends of the wires against the metallic conductors.

A still further feature of the present invention is to provide an electric wire distributor connector of the aforementioned type wherein annular sealing members can be located in groves formed between the conductor housing and the cover where cables containing the electric wires pass through the inlet to resist any flow of water into the connector and distributor housings.

Another further feature of the present invention is to provide an electric wire distributor connector of the aforementioned type wherein the distributor housing can have a circumferentially extending wall projecting upwardly from said distributor housing, an opening provided in said wall, with said connector housing received in said opening and secured to said distributor housing.

A final feature of the present invention is to provide an electric wire distributor connector of the aforementioned type wherein there can be one or more connector housings.

DETAILED DESCRIPTION OF THE PREFERRED EMBODIMENT

Figure 1:
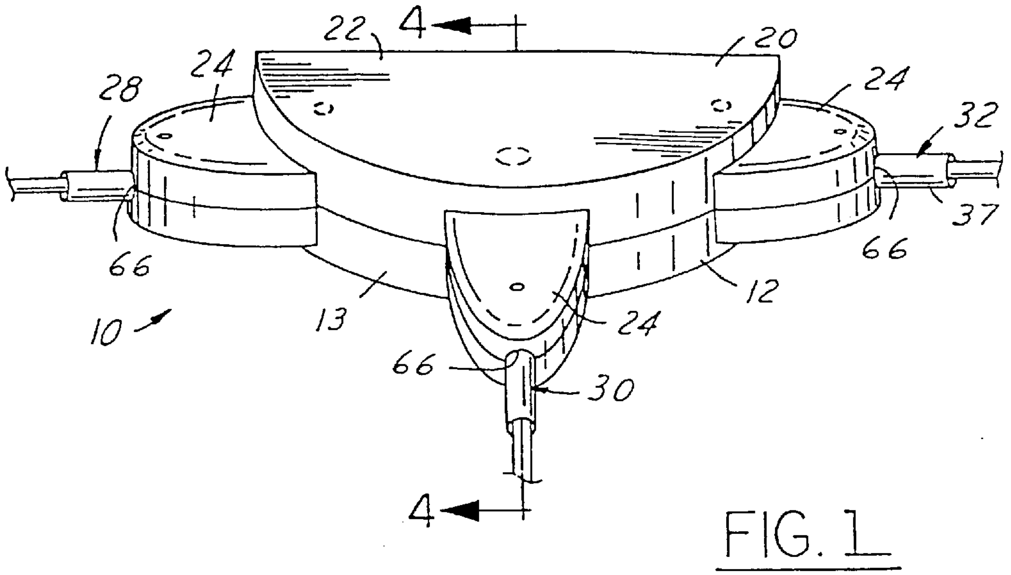
FIG. 1 is the perspective view of the electric wire distributor connector in accordance with the first embodiment of the present invention.
Figure 2:
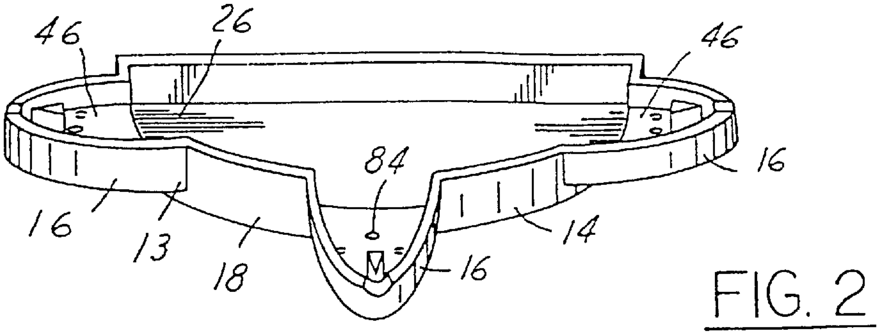
FIG. 2 is a perspective view of the electric wire distributor connector with the cover removed.
Figure 5:
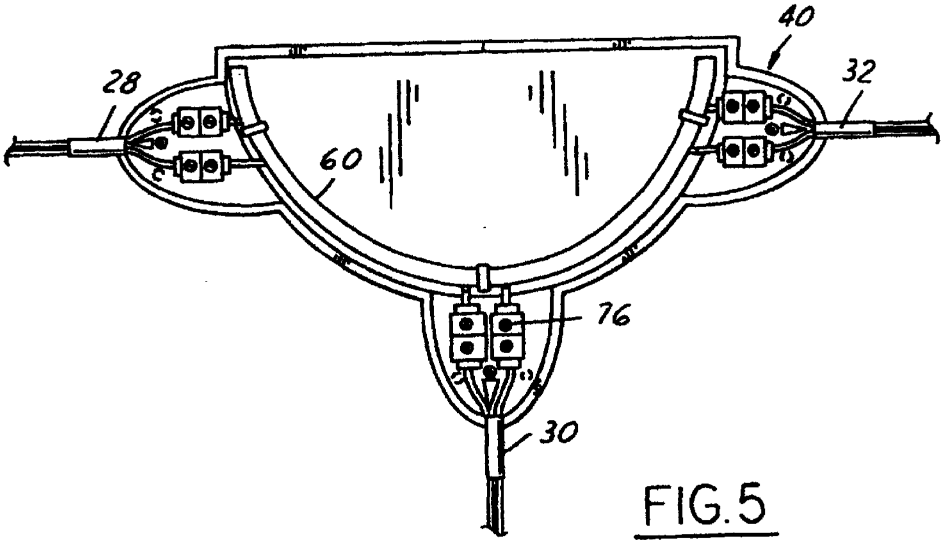
FIG. 5 is a top elevation view of the electric wire distributor connector, with the cover removed and showing the terminal assemblies.

Referring to FIGS. 1, 2 and 5, the first embodiment of an electric wire distributor connector is designated by the numeral 10. The electric wire distributor connector 10 has a housing 12 made from a non-conductive material, preferably a plastic. The housing 12 has a base 13 which includes connector housings portions 16 and a distributor housing 18. The distributor and connector housings 16 and 18 may be formed as an integral as illustrated in FIG. 2 or the connector housings 16 may be formed separately from the distributor housing 18 as will be explained later.

The electric wire distributor connector 10 further includes a cover 20 and cover made from non-conductive material such as plastic material which is placed over and covers the connector and distributor housings 16, 18 as illustrated in FIG. 1. The cover 20 includes cover portion 22 which covers the distributor housings 16, 18 as illustrated in FIG. 1. The cover 20 includes a cover portion 22 which covers the distributor housing 16 and three cover portions 24 which overlie the connector housings 16. The cover portions 24 are integrally formed with the distributor housing cover portion 22 although the connector housing cover portions 24 may be separate from the distributor housing cover portion 22. When the connector housing portions 16 and corresponding cover portions 24 are made as individual units, then the individual connector housings and covers are connected to the distributor housing 18 by inserting the connector housings and covers into corresponding openings provided in the perimeter of the distributor housing 18 until the connector housings are flush with the inner wall of the distributor housing 18. In the modified version just described, the connector housings and covers would be permanently attached to the distributor housing 18 by gluing or otherwise securing them in place. The connector housing 12 and cover 20 define a protected space 26 therebetween.

Figure 3:
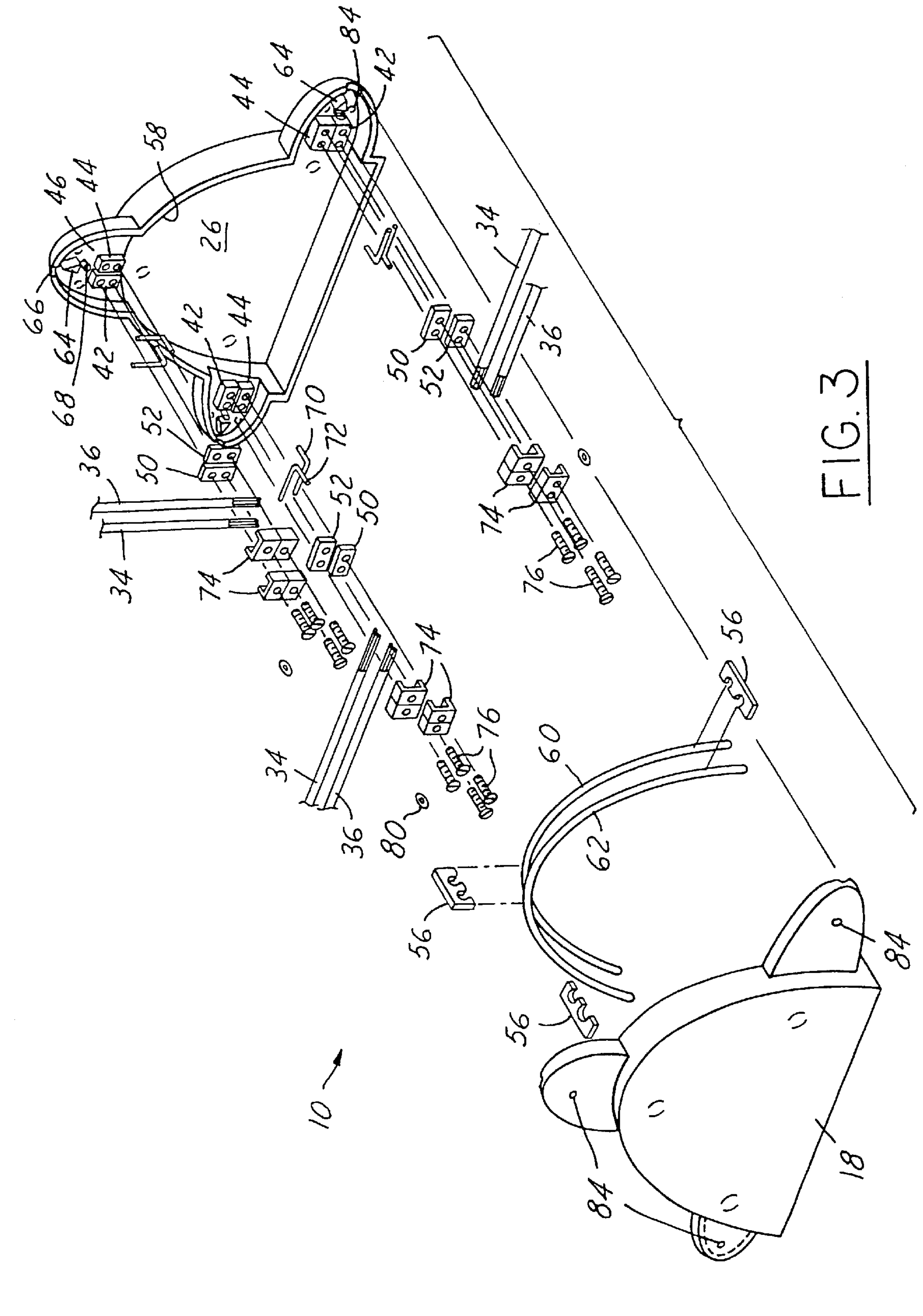
FIG. 3 is an exploded perspective view of the electric wire distributor connector of FIG. 1, showing the internal components thereof.

The electric wire distributor connector 10 is provided for securing electric cables 28, 30 and 32 in place. Each cables multiple wire sections 34 and 36 as illustrated in FIG. 3. As illustrated, each of the cables include two wire sections therein. The cables 28, 30 and 32 generally include tubular insulated sheathing 37 surrounding the wires or wire sections 34,36 as is conventional in the art. Optionally, a three-wire cable can be connected to the connector housings 16 by cutting the ground wire and connecting the wires 34 and 36 from the cables. The electric wire distributor connector 10 of FIGS. 1, 2, and 3 may be used in this way.

The electric wire distributor connector 10 as indicated previously includes a housing 12, which includes the plurality of connector housings 166 formed integrally, as illustrated, with the distributor housing 14. Each connector housings 16 formed integrally, as illustrated, with the distributor housing 14. Each connector housing 16 supports a terminal assembly 40 and associated wiring. Each terminal assembly 40 includes one or more non-conducting mounting blocks 42, 44, which may be separate components glued or otherwise secured to the base floor 46 of the corresponding connector housing 16. As an alternative, the non-conductive mounting blocks 42 and 44 may be integrally cast as part of the connector housing 16.

Figure 4:
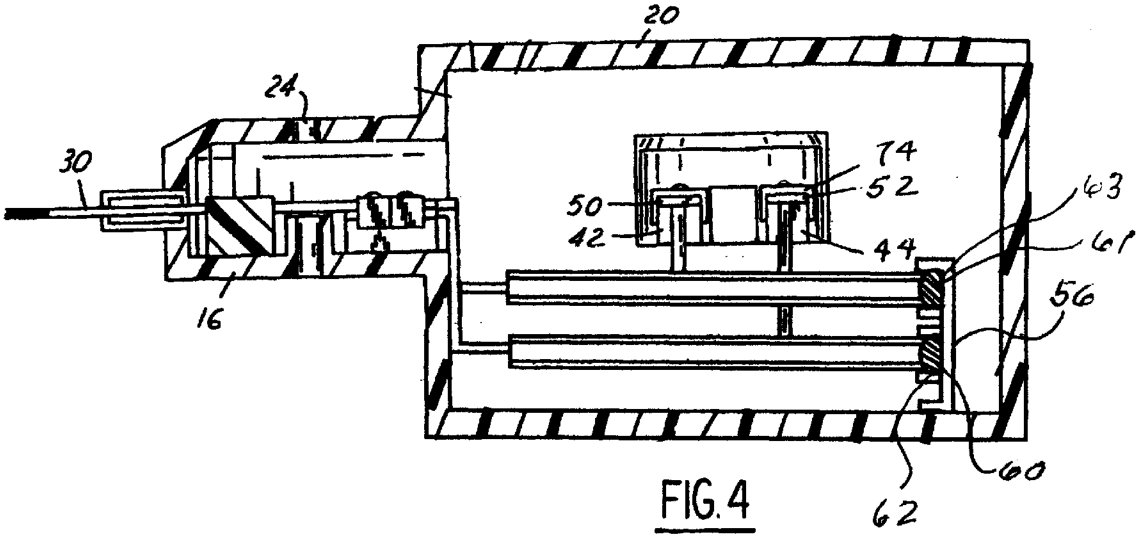
FIG. 4 is a sectional view through the electric wire distributor connector taken on the line 4—4 of FIG. 1.

The mounting blocks 42 and 44 support a pair of spaced apart metallic conductors 50 and 52 as shown in FIGS. 3 and 4. Optionally, the mounting blocks 42, 44 may be color coded to match insulation surrounding the individual wire sections 34, 36. Each distributor housing 16 also contains at least one or more an preferably four snap-on separators or spacers 56. The spacers 56 are secured to the base of the distributor housing 18 for respectively supporting a one or more spaced apart metallic distributors or rings 60 and 62. The outside surface 61 of the distributor rings 60 and 62. The outside surface 61 of the distributor rings 60 and 62 preferably are formed on a radius, while the inside in FIG. 4. The Snap-On separators or spacers 56 may either be separate elements or pieces as illustrated or may be integrally formed integrally formed with the distributor housing 18 at the time it is cast or manufactured.

The Snap-On spacers 56 are non-conductive and may be generally made from plastic material. The inside groves of the spacers 56 are formed on a radius to conform to the radius of the outside of the distributor rings 60, and 62 and inside of the flat side or surface of the distributor rings 60, and 62, leaving an opening on the flat side so that the distributor ring can be snapped on to a corresponding spacer 56. The Snap-On spacers 56 can be place d one above the other can be combined to form one separate Snap-On spacer. The spacers 56 are generally set apart around the perimeter of the distributor rings 60 and 62 and are attached to the base of the of the distributor housing.

As an optional feature, each connector housing portion 16 may contain separator wedges 64 which are located inside the inlet, outlet 66 through which the cables extend. When used, the separator wedges 64 separate, and space apart pairs of incoming and outgoing wires. Each connector housing portion 16 also contains an internally threaded vertical tubular boss 68. The tubular boss 68 receives screws or other threaded fasteners therein to removable connect the cover 20 and the connector and distributor housings together.

Rather than utilizing separate tubular bosses 68 in each of the connector housings 16 and separator wedges 64, the functions of the tubular bosses 68 and wedges 64 may be combined. In other words, instead of the arrangement shown in FIG. 3, threaded bores may be formed in the wedges 64 and appropriately spaced holes would be formed, through the cover 20. It is also possible to eliminate the tubular bosses 68 from the connector housings by replacing them with one half circular tabs attached to the outside of the housing, in pairs one above the other, one attached to the top cover, and the other attached to the bottom cover, with holes bored through them so screws can be threaded through them and into a nut at the other end, so the top cover can be secured over the bottom cover. They are placed where ever necessary.

Each terminal assembly 40 includes at least two metallic conductors 50, 52 attached to the respective mounting blocks 42, 44. The conductors 50, 52 may be provided as generally square metallic bars as shown. Each terminal assembly 40 also contains two metallic extension rods 70, 72 which are respectively attached on one end to the respective metallic conductors 50, 52. The other end of the metallic extension rods 70, 72 are attached or secured to the distributor rings 60, 62 respectively to transfer electric current from the respective conductors 50, 52 to the respective distributor rings 60, 62 and vice versa. The metallic extension rods 70, 72 preferably can be soldered to the respective metallic conductors 50, 52. In addition, the other ends of the metallic rod extensions 70, 72 may be soldered to the distributor rings 60, 62.

Each terminal assembly 40 further includes a plurality of clamping members 74. Clamping members 74 are provided as inverted, substantially U-shaped members for placement over the exposed ends of the wires 34, 36 and ends of the metallic conductors 50, 52 and for clamping the wire ends 34,36 against the metallic conductors 50, 52 Each terminal assembly 40 includes four inverted, substantially U-shaped members 74 as illustrated in FIGS. 3 and 5.

Each terminal assembly 40 further includes threaded fasteners 76, such as screws or the like, for attaching each of the respective, U-shaped members 74 to the appropriate and corresponding mounting blocks 42, 44. In the first embodiment as shown in FIGS. 1–3, the metallic conductors 50, 52 each has holes formed irrespective first and second ends thereof to receive the threaded fasteners 76 therethrough, so that the conductors 50, 52 may be attached to the corresponding conductor housing portion 16.

In using the electric wire distributor connector 10, the fastener 76 are loosened and then the exposed ends of the wire 34,36 are placed between the U-shaped members 74 and the tops of the metallic conductors 50,52. Once the ends of the wires 34,36 are in place, the fasteners 76 are tightened to releasable attach the wires 34, 36 to the metallic conductors 50, 52.

As a modification of the embodiment just described, in a stripped down version the electric wire distributor 10, according to the present invention, the U-shaped members 74 are dispensed with and the exposed ends of the wires 34, 36 are simply wrapped around the shafts of the fastener 76, which are then tightened to clamp the ends of the wires 34, 36 against the conductors 50, 52.

The housing 12 may be provided with O-rings or similar annular sealing members 80 for respective placement in saddle groves formed in the base 13 and cover 20, where the cables 28, 30 and 32 pass through the inlet, outlet 66 to resist any flow of water into the unit. The inlet, outlet 66 provided in each of the connector housings 16 may be modified to receive two or more cable wires in a single end of the housing 12 for a particular application. Alternately, the inlet openings or holes 66 could be modified to receive conduit sections therein.

Optionally, the housing 12 may have one or more removable punch-outs 84 formed in the wall thereof as shown in FIG. 3, for use in mounting the electric wire distributor connector 10 to a wall or other substrate. The punch-outs 84 are of the wall of the housing 12 which have been preweakened for easy removal thereof, where desired. The punch-outs 84 may be opened with an appropriate tool, when desired, to create holes in the base 13 to accommodate appropriate mounting hardware. The base 13 may also have a removable punchout hole formed therein, as an inlet, outlet 66 to secure electric wires to the appropriate terminal connector assembly 40. The punch-outs forming the inlet, outlet 66 are areas of the wall of the housing 12 which have been weakened for easy removal thereof. Such weakened areas may be opened with an appropriate tool to create a hole such as the inlet, outlet 66 in the base 13 to accommodate electric wires.

Referring to FIG. 2 the underside of the cover 20 is shown. The cover 20 has punch-out holes 84 formed therethrough to allow the fasteners to pass therethrough. The cover 20 may, optionally, contain complimentary the separator wedges 64 at the base 12. The cover 20 may also optionally include one or more additional punch-outs 84 if desired. The cover 20 may also contain an additional punch-out 84 attaching incoming, outgoing wires to the respective metallic conductor 50, 52.

Figure 6:
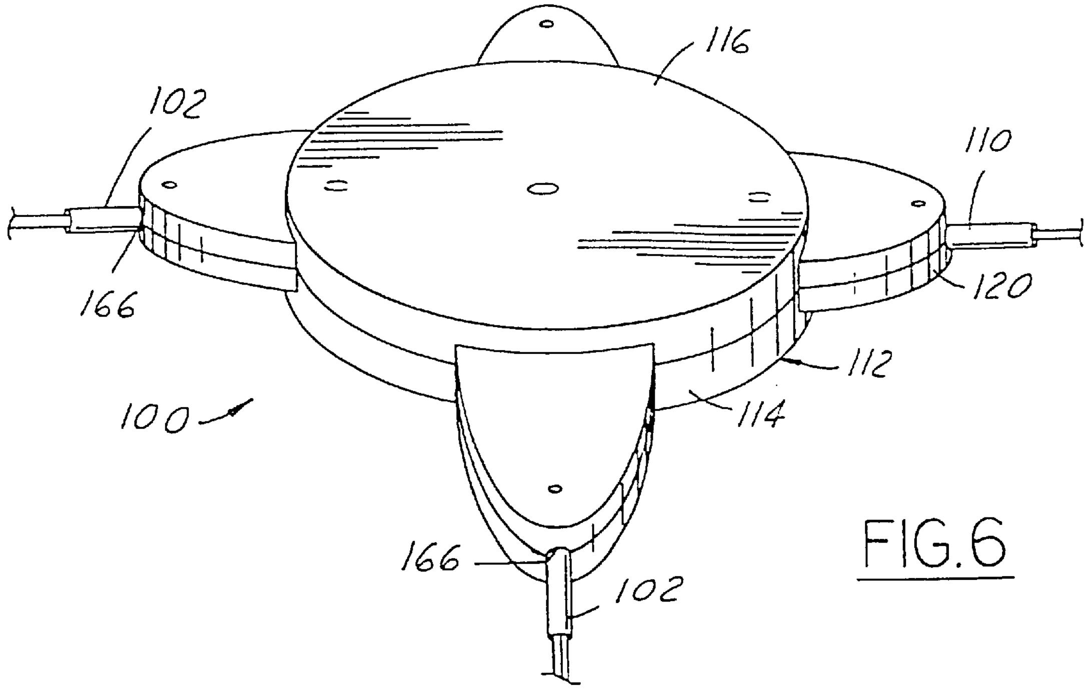
FIG. 6 is an exterior perspective view of the electric wire distributor connector constructed in accordance with the second embodiment of the present invention
Figure 7:
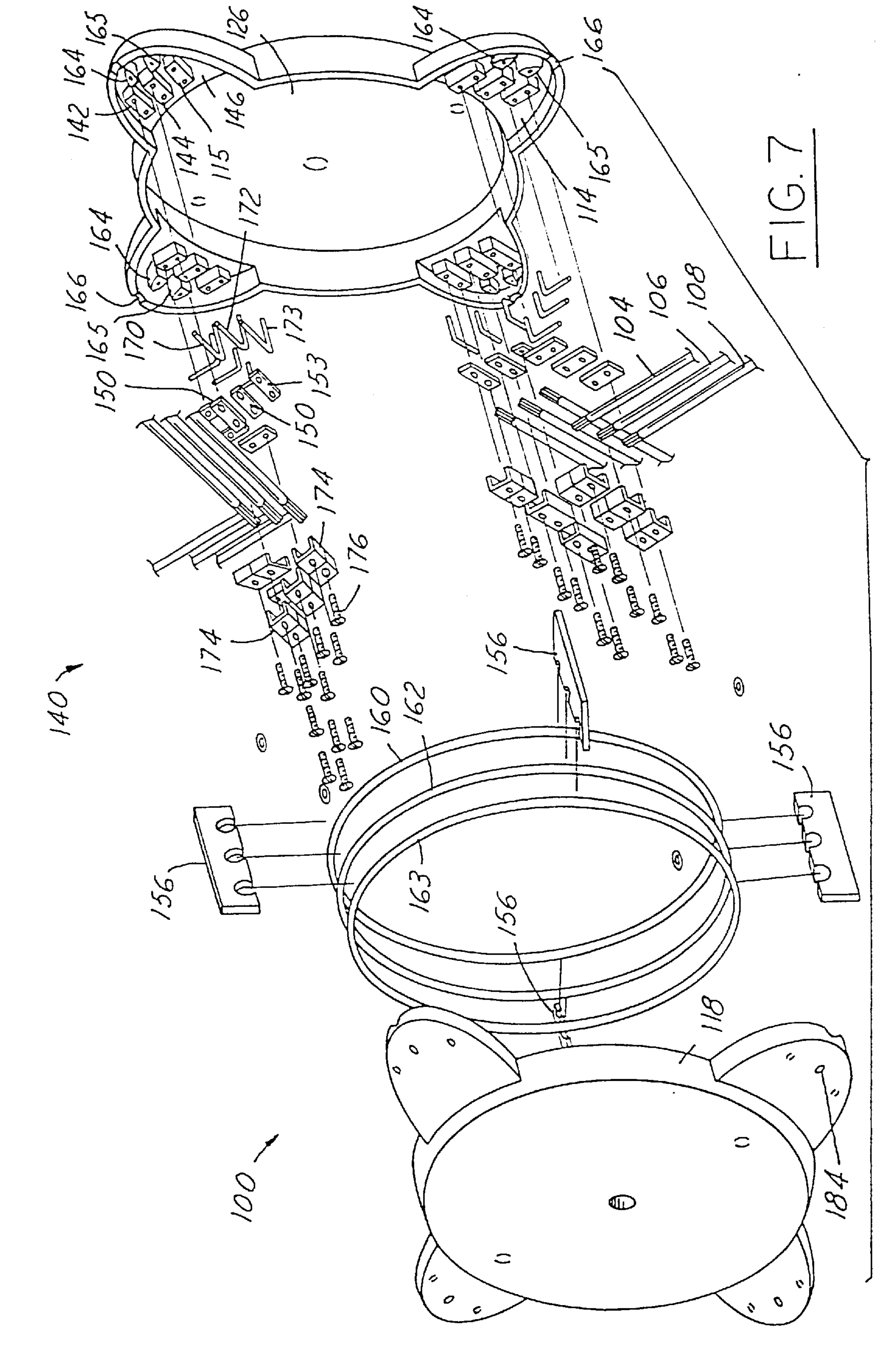
FIG. 7 is an exploded perspective view of the electric wire distributor connector of FIG. 6, showing the internal components thereof.

Another embodiment of the present invention is illustrated in FIGS. 6 and 7 where the electric wire distributor connector is designated by the numeral 100. This embodiment includes many of the features of the first embodiment and includes a fourth connector housing portion rather than three connector housing portions 16 as in the first embodiment. The electric wire distributor connector 100 is for connecting electric cables 102, one for each connector housing, which normally includes multiple wire sections 104, 106, 108 as illustrated in FIG. 7 to a distributor ring to receive and distribute electric current in one or more directions.

Each cable 102 has the three wires 104, 106, 108 therein surrounded by tubular insulated sheathing 110. The cables 102 are not part of the present invention, per se, rather the invention is directed to the use of the electric wire distributor connector 100, which is usable to facilitate receiving and distributing electric current in one or more directions.

The electric wire distributor connector 100 includes a housing 112 which includes a base 114 and a cover 116. The base 114 includes a distributor housing portion which is integrally formed with the four conductor housing portions 120. The cover 115 is placed over the base 114 which is used for supporting four conductor housing portions 120. The cover 116 is placed over the base 114 which is used for supporting four terminal assemblies 140 and associated wiring as illustrated in FIG. 7. The cover 116 is placed over the terminal assemblies 140 and the housing 112 as illustrated in FIG. 6.

The housing 112 is provided to surround and protect the wires 104, 106, 108. Both the base 114 and cover 116 are made of a non-conductive material, preferably a suitable plastic material. The base 112 and the cover 116 also define inlets, outlets 166 therebetween for receiving the ends of the cables 102 for diverting electric current in one or more directions within a protected space 126 defined between the base 112 and cover 116.

The connector housing portions 120, four in number, each contains three integrally formed mounting blocks 142, 144 and 145 therein for respectively supporting three spaced apart metallic conductors 150, 152 and 153 thereon. The mounting blocks 142, 144 and 145 may either be separate pieces or elements which are glued or otherwise secured to the floor 146 of the base 114. As an alternative, the mounting blocks 142, 144, and 145 may be integrally formed as part of the base 114 when the base 114 is cast. In addition, the mounting blocks 142, 144, 145 may be color coded to match insulation surrounding the individual wire sections 104, 106,108. As an example, a first mounting block 142 may be colored white to match the insulation on another wire of the main wire section, a second mounting block 144 may be colored black to match insulation on another of the main wire section and finally a third mounting block 146 may be colored green to match standard insulation surrounding the ground wire section.

Each terminal assembly 140 includes the three metallic conductors 150, 152, 153 which are attached to the respective mounting blocks 142, 144 and 145. The connectors may be generally flat metal bars. Each terminal assembly 140 also contains three preferably square metallic extension rods 170, 172 and 173 attached or soldered on one end thereof to flattened metallic bars 150, 152, 153. The extension rods on the other ends are attached or soldered to the distributors or distributor rings 160, 162, 163 which are located in the distributor housing 114, to transfer electric current from the metallic conductors 150, 152, 153 to the respective distributor rings 160, 162, 163. The three distributor rings 160, 162, 163, which are attached to the square metallic extension bars are supported by nonconducting snap-on spacers 156. The spacers are placed wherever it is necessary to support and space apart the distributor rings 160, 162, 163. Each ring has an outside surface formed on a radius and an inside surface which is flat as in the other embodiment.

Each terminal assembly 140 further includes clamping members 174 for placement over the exposed ends of the wires 104, 106 and also covering the ends of the metallic conductors 150, 152 and 153 and 153 for clamping the wire ends against the metallic conductors. In the embodiment of FIGS. 6 and 7, each terminal assembly includes six inverted substantially U-shaped members 174. The terminal assembly 140 further includes threaded fasteners 176, such as screws or the like, for attaching each of the respective U-shaped members 174 to the appropriate mounting blocks 142, 144 and 145. The metallic conductors 150, 152 and 153 each have holes formed in the first and second ends thereof to receive the threaded fasteners 176 therethrough so that the conductors may be attached to the base 114.

The base further contains two separator wedges 164, 165 which are located respectively inside the inlet, outlet 166. The separator wedges 164, 165 may optionally, but necessarily be provided for separating, and spacing apart the incoming, outgoing wires. If desired, the separator wedges 164, 165 may have threaded holes formed vertically therein to receive threaded fasteners 176 to aid in removable fastening the cover 116 to the base 114. Further, the separator wedges 164, 165 may have threaded holes formed therein to receive the threaded fasteners.

The base 114 and cover 116 may have one or more removable punch-outs 184 formed in walls thereof, for use in mounting the electric wire distributor connector 100 to a wall or other substrate as discussed in connection with the first embodiment. The punch-outs 184 may be opened with an appropriate tool when required, to create holes in the base 114 to accommodate appropriate hardware. Also the base may also contain a removable punch-out hole 184 formed in the base thereof, for use in securing incoming, outgoing wires to respective metallic conductors.

Figure 8:
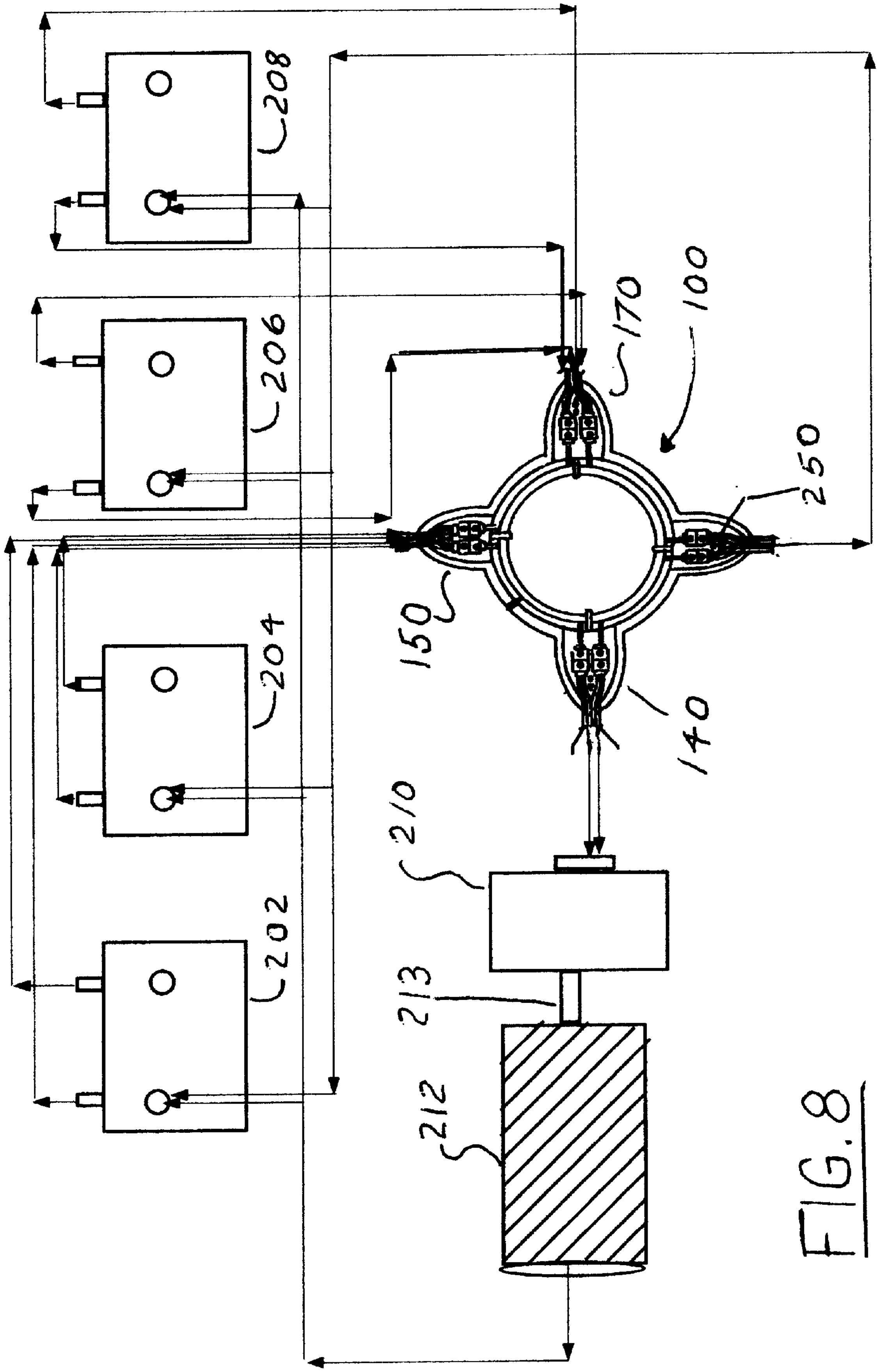
FIG. 8 is an electrical diagram or circuit showing the electric wire distributor connector providing the means for an electric car to run continuously by allowing the batteries to recharge themselves, and also to run an electric motor, which runs a generator that recharges the batteries, thereby allowing the electric car to run continuously, or in other words run perpetually without being recharged by any outside source.

One of the many uses for the electric wire distributor connector is illustrated in the electrical circuit 200 of FIG. 8 where four batteries 202, 204, 206, 208 are illustrated. These batteries, as an example, may be the batteries used to provide power to run an electric vehicle. The current or voltage, and amperes from batteries 202 and 204 is directed to the electric wire distributor connector 100 at terminal assembly 150. Batteries 206 and 208 are directed to terminal assembly 170. One of the terminal assemblies 140 of distributor 100 is connected to and drives a battery driven motor 210 which is in turn connected to and drives a generator 212 by a shaft 213. The generator 212 directs the current or voltage, and amperers to the batteries 202–208 inclusive to recharge the batteries. Terminal assembly 250 distributes electric current or recycle electric current or voltage and, amperes back to batteries 202–208. Terminal assembly 250 can also generate electric current or voltage the same as previously mentioned above at 140, 210, 212, 213 to recharge the batteries 202–208 inclusive. The procedures can be repeated as many times as necessary at added terminal assemblies to run the electric car continuously without the batteries being recharge from any outside source, which is of perpetual motion.

A regulator, preferably electronically controlled, can be used to control the flow of electric current or voltage, and amperes. The controlling device could be installed inside the top cover of the distributor Although the present invention has been described herein with respect to the preferred embodiment thereof, the forgoing description is intended to be illustrative, and not restrictive. Those persons skilled in the art will realize that many modifications of the preferred embodiment could be made which would be operable. For an example the electric wire distributor connector is not limited to being used with 110 volt AC current, but instead, may be modified, as appropriate to be used with any type of electric wire or cable. The electric wire distributor connector can be modified to divert electric current at an angle and, also to accommodate any conduit. The electric wire distributor connector can also be modified so that the connector housing are within the same housing so that the electric wire distributor resembles a vehicle distributor in design, to save on material an be more compact. All such modifications, which are within the scope of the claims, are intended to be within the scope and spirit of the present invention.

I claim:

1. An electric wire distributor connector for receiving and distributing electric current through electric wires comprising:

a housing made of non-conductive material, the housing comprising:

a base;

a cover placeable in covering relation over the base and being removably attachable thereto;

said base and said cover defining an inlet therebetween for receiving the electrical wires;

a terminal assembly comprising:

at least one metallic conductor attached to said base;

a metallic extension rod having a pair of ends, one end being attached to said at least one metallic connector; and a metallic distributor ring mounted in said base;

the other end of said metallic extension rod being attached to said distributor ring to transfer current from said metallic conductor to said ring and vice-versa.

2. An electric wire distributor connector for receiving and distributing electric current through electric wires comprising:

a connector housing having a first mounting wall;

a distributor housing having a second mounting wall;

said connector and distributor housings being connected together and made from a non-conductive material;

a cover made from a non-conductive material placeable in covering relations over said connector and distributor housings and being removeably attached thereto;

said connector housing and said cover defining an inlet therebetween for respectively receiving electrical wires;

a terminal assembly comprising a plurality of mounting blocks attached to said first mounting wall;

a plurality of metallic conductors attached to said mounting blocks, one conductor for each mounting block;

a plurality of metallic extension rods, each having a pair of ends, one extension rod for each of the metallic conductors, with one end of each extension rod being attached to a corresponding metallic conductor;

a plurality of spaced apart metallic distributors secured to the second mounting wall of said distributor housing; and the other ends of said extension rods being attached to the distributors to transfer current from said metallic conductors to said distributor and vice versa.

3. The electric wire distributor connector as recited in claim 2, wherein said distributors are in the form of spaced apart metallic annular rings, with the other ends of the extension rods being attached to said corresponding rings.

4. The electric wire distributor connector as recited in claim 3, wherein the outer periphery of each ring is formed on a radius, with the inside of each ring being flat.

5. The electric wire distributor connector as recited in claim 4, wherein a plurality of spacers support said distributor rings, said spacers being attached to said second mounting wall, said spacers being flat on one side and secured to said second mounting wall and curved on the inside to conform to the radius of the outside of said rings.

6. The electric wire distributor connector as recited in claim 2, wherein said mounting blocks are separate elements which are spaced apart and are secured to said first mounting wall of said connector housing.

7. The electric wire distributor connector as recited in claim 2, wherein said mounting blocks are separate elements which are integrally formed as part of said first mounting wall of said connector housing when the connector housing is made.

8. The electric wire distributor connector as recited in claim 2, wherein said mounting blocks can be color coded to match insulation surrounding the individual electric wires.

9. The electric wire distributor connector as recited in claim 2, wherein said first mounting wall of said connector housing is provided with separator wedges for separating, supporting and spacing apart pairs of incoming or outgoing of said electrical wires.

10. The electric wire distributor connector as recited in claim 2, wherein said connector housing is provided with a plurality of vertically upstanding tubular bosses which receive threaded fasteners therein to removably connect said cover to said connector and distributor housings.

11. The electric wire distributor connector as recited in claim 9, wherein said separator wedges are provided with said threaded holes to receive threaded fasteners therein to removably connect said cover to said connector and distributor housings.

12. The electric wire distributor connector as recited in claim 2, wherein said first mounting wall of said connector housing is provided with a plurality of punched-out openings formed therein for use in mounting the distributor connector to a wall or other substrate.

13. The electric wire distributor connector as recited in claim 2, wherein a plurality of punched-out areas are provided in the first mounting wall of said connector housing for the purpose of creating holes in the housing connector to accommodate said electric wires.

14. The electric wire distributor connector as recited in claim 2, wherein the terminal assembly includes a plurality of clamping members which overlie the metallic conductors and through which threaded fasteners extend to operatively connect the clamping members and metallic conductors to said mounting blocks.

15. The electric wire distributor connector as recited in claim 14, wherein each clamping member is an inverted substantially U-shape member which is placed over the exposed ends of the wires and the end of the corresponding metallic conductor for clamping the wire ends against the metallic conductor.

16. The electric wire distributor connector as recited in claim 15, wherein said exposed ends of the electric wires are placed between the U-shape members and the tops of the metallic conductors and thereafter the threaded fasteners are tightened to releaseably attach the wires to the metallic conductors.

17. The electric wire distributor connector as recited in claim 14, wherein said threaded fasteners of said terminal assembly form the clamping members, with the exposed ends of the wires being wrapped around the threaded fasteners and thereafter the threaded fasteners are tightened to clamp the ends of the wires against the conductors.

18. The electric wire distributor connector as recited in claim 2, wherein annular sealing members are located in grooves formed between said conductor housing and said cover where cables containing the electric wires pass through the inlets, outlets, to resist any flow of water into said connector and distributor housings.

19. The electric wire distributor connector as recited in claim 2, wherein said distributor housing has a circumferentially extending side wall projecting upwardly from said second mounting wall, an opening provided in said side wall with said connector housing being received in said opening and secured to said distributor housing.

20. The electric wire distributor connector as recited in claim 19, wherein there are a plurality of said connector housings, each connector housing being located in a corresponding opening provided in said side wall and secured thereto.

21. The electric wire distributor connector of claim 20, wherein there are three connector housings.

22. The electric wire distributor connector of claim 20, wherein there are four connector housings.

23. An electric wire distributor connector for receiving and distributing electric current through electric wires comprising:

a housing made of non-conductive material, the housing comprising:

a base;

a cover placeable in covering relation over the base and being removably attachable thereto;

said base and said cover defining an inlet therebetween for receiving the electrical wires;

a terminal assembly comprising:

at least one metallic conductor attached to said base;

a metallic extension rod having a pair of ends, one end being attached to said at least one metallic connector;

adjustably tightenable means for clamping the electrical wires against the at least one metallic conductor, said adjustably tightenable clamping means comprising a separate releaseably tightenable fastener for each of the electrical wires, and a clamping member operatively associated with each releaseably tightenable fastener wherein the adjustable tightenable clamping means is operatively connected to the base of said housing; and a metallic distributor ring mounted in said base;

the other end of said metallic extension rod being attached to said distributor ring to transfer current from said metallic conductor to said ring and vice-versa.

24. The electric wire distributor connector as cited in claim 23, further comprising a first sealing member adjacent said inlet.

25. The electric wire distributor connector as cited in claim 23, wherein said terminal assembly includes at least one mounting block, and wherein the at least one metallic conductor is attached to said mounting block.

26. The electric wire distributor connector as cited in claim 23, wherein at least two mounting blocks are provided in said terminal assembly which is secured to said base and disposed under said metallic conductors, with a threaded hole formed in each end of said mounting blocks.

27. The electric wire distributor connector as cited in claim 23, wherein said housing base comprises two non-conductive internally threaded tubes integrally secured to an inner surface thereof and extending inwardly in said housing; and wherein two threaded fasteners are provided for threadable engagement in said threaded tubes of said base, to attach said cover to said base.

28. The electric wire distributor connector as cited in claim 23, wherein said at least one metallic conductor comprises at least two metallic conductors.

29. The electric wire distributor connector as cited in claim 23, wherein said at least one metallic conductor comprises at least three metallic conductors.

30. The electric wire distributor connector as cited in claim 25, wherein said at least one mounting block comprises at least two mounting blocks, and wherein said at least one metallic conductor comprises at least two metallic conductors respectively mounted on said at least two mounting blocks.

31. The electric wire distributor connector as cited in claim 26, wherein the at least two mounting blocks are colored differently from one another.

* * * * *